United States Patent Office 3,376,365
Patented Apr. 2, 1968

3,376,365
PHOSPHINOTHIOATE ESTER
Thomas M. Melton, Richmond, Va., assignor to Mobil Oil Corporation, a corporation of New York
No Drawing. Filed Dec. 28, 1964, Ser. No. 421,707
10 Claims. (Cl. 260—941)

ABSTRACT OF THE DISCLOSURE

Phosphinothioate esters having at least one alkyl bound to phosphorus through a sulfur atom, and also having one alkyl bound directly to phosphorus are provided. The new compounds are useful as insecticide.

---

This invention relates to new phosphinothioate and phosphinodithioate esters useful as insecticides. More particularly the invention relates to phosphinothioate and phosphinodithioate esters of the formula

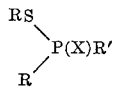

wherein R is an alkyl having from 1 to 4 carbon atoms, R' is a member of the group consisting of an olefinic hydrocarbon of up to about 12 carbon atoms, carbethoxy methyl, and

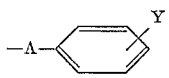

wherein A is alkylene containing up to 2 carbon atoms and wherein Y is a member of the group consisting of hydrogen, halogen, and alkyl having from 1 to 12 carbon atoms, and X is a member of the group consisting of oxygen and sulfur.

Even more particularly, the invention relates to compounds of the formula

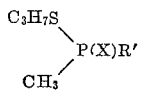

wherein R' and X are as defined above.

The inventive esters may be prepared generally by known methods, and are prepared specifically as set forth in the illustrative examples.

The esters of this invention may be used per se as insecticides. However, since they are effective at low levels, it is desirable to apply them in the form of solutions or dispersions or solid formulations containing a specified amount of the active ingredient.

When "solutions" is used herein it means that the esters of the invention are of molecular size held in true solution by any suitable solvent therefor. The chemicals of the invention are generally water insoluble, and will, when preparing a solution, require the use of an inert organic liquid as the solvent. Therefore in addition to the requirement that the toxic ingredient be soluble therein at all reasonable levels, phytotoxicity of the solvent itself must be considered. Obviously, then, the organic solvent must be one which has no phytotoxic effects, or, if it does, it must be dissipated quickly enough for such effects to be negligible. For example, acetone may cause plant injury, but when sprayed in the open it evaporates away from the plant, leaving it free from injury.

By "dispersion" is meant that the esters of the invention are or may be colloidal in size and distributed throughout a liquid phase, as particles held in suspension by wetting agents. It is also intended to cover other suspensions, such as those obtained when using soaps. The dispersive medium is generally aqueous in nature, but it may contain small amounts of organic solvents, i.e. amounts not sufficient to cause solution of the active ingredients.

In addition to aiding in suspending the toxic particles, the wetting or emulsifying agents are useful as aids in uniformly distributing the active material over the plant to be treated. In other words, they aid in preventing a build-up of droplets on certain portions of the leaves or other plant parts, leaving other portions untouched or insufficiently treated by the toxicant. The useful wetting agents are not phytotoxic, or are used in such small amounts that their toxic effect is negligible. As an example of a useful wetting agent, Tween–20 (polyoxyethylene sorbitan monolaurate) may be mentioned. Others are so well-known to the art that it will serve no useful purpose to enumerate them here.

"Solid formulations," as used herein, shall be construed to mean all of those useful formulations known to the art, whether dust or granular in form. There are many known solid carriers which are commonly used. Such solid carriers include kaolin, talc, bentonite, kieselguhr, pyrophyllite, diatomaceous earth, tricalcium phosphate, calcium carbonate, fuller's earth, powdered cork and wood, flour, powdered walnut shells, and powdered peanut shells. The formulations employing these carriers and the esters of the invention may be used in dry form, or in the form of wettable powders containing water and water-soluble surfactants or wetting agents.

In preparing these solid formulations, the active ingredient and carrier may be ground together in such a manner and for such a time that an even distribution of the chemical is obtained. This method, however, is generally time consuming and more often than not fails to give a uniform formulation. It has been found that a more uniform product can be reproducibly made by dissolving the active ingredient in a volatile solvent such as acetone (usually a 10% solution), adding this to a tumbling mass of the carrier, tumbling further until well-mixed, and then drying in any convenient manner. The drying, for example, may be by applying heat to the tumbling mass or by spreading it into a thin layer and allowing it to air dry.

In addition to the above-discussed formulations, the esters of this invention may be applied as aerosols, in which case it is convenient to dissolve them in any suitable solvent and to disperse this solution in dichlorodifluoromethane or other chlorofluoralkane having a boiling point below room temperature at ambient pressures.

The precise concentration of the chemicals disclosed herein may vary over a considerable range provided a lethal or toxic dosage thereof is placed upon the insect or in its immediate surroundings. Taking all of the formulations mentioned together, the concentration of active ingredient in them may be within the range of from about 0.01% to about 50% by weight. However, as a matter of general utility the formulations will most often contain from 0.01% to about 1% active ingredient by weight. Rates higher than 1% may at times be necessary because of weather conditions, pest resistance and the like. Usually, however, the stated range will be sufficient.

In controlling or combatting insect pests the esters of this invention, either as such or as part of compositions, may be applied to the insects or to their environment in insecticidal quantities. This can be done by applying the agent, or compositions containing it, to the pest itself, to its food supply, or in or around its habitat. Where it is desired to control soil-borne insects, the toxicant or compositions containing it may be sprayed (if a liquid) or spread (if a solid) over the ground. Thereafter, the material may be left to the natural action of rainfall, or it may be drenched or plowed and disked into the soil. If the host is plant life, a solid formulation may be dusted onto the plant in the same manner as for the application of other powders such as DDT. If a wettable powder is desired, its manner of application will be similar also to that used for DDT. When employing liquid sprays on plants, a composition containing a toxic quantity of active ingredient may be sprayed onto the plant just to the point of liquid run-off.

The following examples will illustrate the preparation of the compounds of this invention. It will be understood that they are illustrative only, and that they are intended in no way to be a limit on the invention. "Parts" are parts by weight.

EXAMPLE 1

S - propyl benzyl(methyl)phosphinothioate of the formula

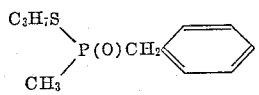

Twenty-five and three-tenths parts of benzyl chloride was placed in a suitable reaction vessel equipped with a stirrer, reflux condenser, thermometer and means for liquid addition. 30.4 parts of O-methyl S-propyl methyl-phosphonothioite ($C_3H_7S(CH_3)POCH_3$) was added, with stirring to the benzyl chloride in 15 minutes at 150° C. Stirring was continued at this temperature for 2 hours, at the end of which time titration with 0.1 N. $I_2$ showed the absence of any $P^{+3}$ compound. The distilled product had the following properties:

Boiling point—144–146° C. at 0.5 mm. of Hg
Refractive index—1.5595 at 27° C.
P (calculated) 13.54%; P (found) 13.73%

EXAMPLE 2

S-propyl p-bromobenzyl(methyl)phosphinothioate of the formula

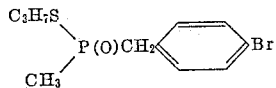

Fourteen and four-tenths parts of p-bromo benzyl bromide and 43 parts of toluene were placed in a reaction vessel and heated to 60° C. 8.76 parts of the phosphonothioite of Example 1 was added thereto, with stirring, at 70–75° C. over a period of 16 minutes. The reaction was carried to completion by stirring for 2 hours at 70–75° C. The toluene was removed in vacuo, and the crude product was distilled, giving an overall 58.8% yield. The product had the following properties:

Boiling point—165–168° C. at 0.1 mm. of Hg
Refractive index—1.5762 at 29° C.
Density—1.436 at 20°/4° C.
P (calculated) 10.10%; P (found) 10.60%

EXAMPLE 3

S-propyl 2,4-dichlorobenzyl(methyl)phosphinothioate of the formula

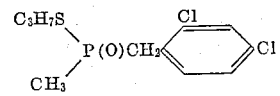

Thirty-three and three-tenths parts of O-methyl S-propyl methyl-phosphonothioite was placed in the reaction vessel of Example 1, it was flushed with nitrogen, and 39.1 parts of 2,4-dichlorobenzyl chloride was added, with stirring, at 100° C. over a period of 15 minutes. Stirring was continued for 4 hours at 100° C. Titration with iodine showed all the $P^3$ compound had reacted. The distilled product had the following properties:

Boiling point—190° C. at 0.7 mm. of Hg
Refractive index—1.5875 at 22° C.
Density—1.294 at 20°/4° C.
P (calculated) 10.41%; P (found) 11.20%.

EXAMPLE 4

S-propyl phenethyl(methyl)phosphinothioate of the formula

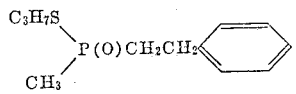

2-chloroethylbenzene, 14.1 parts, was placed in the recation vessel of Example 1 and heated to 100° C. 15.2 parts of O-methyl S-propyl methylphosphonothioite was added, while stirring, at this temperature. To complete the reaction, stirring was continued for 2 hours at 100° C. and for 14 hours at 150° C. The product, after distillation, had the following properties:

Boiling point—150° C. at 0.25 mm. of Hg
Refractive index—1.5526 at 32° C.
Density—1.085 at 20°/4° C.
P (calculated) 12.77%; P (found) 12.56%

EXAMPLE 5

S-propyl dodecylbenzyl(methyl)phosphinothioate of the formula

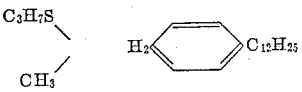

Fifteen and two-tenths parts of O-methyl S-propyl methylphosphonothioite was added, while stirring, to 29.4 parts of dodecylbenzyl chloride at 100° C. over a 15 minute period. There was no discernible reaction. Upon heating to 150° C., the reaction began, and it was completed by heating, with stirring, for 2 hours at temperatures ranging from 150–190° C. The distilled product had the following properties:

Boiling point—220° C. at 0.4 mm. Hg
Refractive index—1.5202 at 29.5° C.
Density—1.011 at 20°/4° C.
P (calculated) 7.81%; P (found) 7.83%.

EXAMPLE 6

S-propyl allyl(methyl)phosphinothioate of the formula

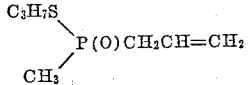

Thirteen and three-tenths parts of O-methyl S-propyl methylphosphonothioite was added to refluxing allyl bromide. The reaction was completed by heating the reaction mixture, while stirring, at 70° C. for 4 hours. Upon distillation, the product had the following properties:

Boiling point—117–120° C. at 8 mm. of Hg
Refractive index—1.4962 at 31.5° C.
Density—1.097 at 20°/4° C.
P (calculated) 17.36%; P (found) 17.73%.

EXAMPLE 7

S-propyl dodecenyl(methyl)phosphinothioate of the formula

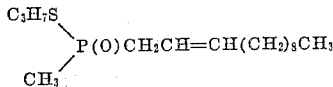

Twenty and three-tenths parts of dodecenyl chloride was placed in a suitable reaction vessel, heated to 175° C., and the vessel was flushed with nitrogen. While stirring the heated chloride, 15.2 parts of O-methyl S-propyl methylphosphonothioite was added thereto over a period of 15 minutes. The reaction was completed by heating, while stirring, at 175° C. for 4 hours. The distilled product had the following properties:

Boiling point—170–180 at 0.4 mm. of Hg
Refractive index—1.5056 at 28° C.
Density—0.980 at 20°/4° C.
P (calculated) 10.16%; P (found) 9.98%.

EXAMPLE 8

S-propyl carbethoxymethylmethylphosphinodithioate of the formula

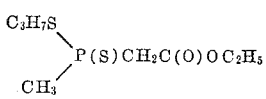

2.3 parts of sodium metal was added to 16.0 parts of ethyl malonate and 400 parts of dry benzene in a suitable container, and timed at 35° C. for 4 hours. The temperature was then raised to 80° C. and heated with stirring for 6 hours to complete the reaction. The mixture was cooled to room temperature, and 18.9 parts of S-propyl methylphosphonochloridodithioate was added at 25° C., then heated at 70° C. for 3 hours. The product was filtered and then washed with 50 parts of benzene. Distillation caused decarboxylation to give 9.8 parts of product which had the following properties:

Boiling point—149–52° C. at 0.45 mm. of Hg
Specific gravity—1.5280 at 30° C.
Density—1.117 at 20°/4° C.
P (calculated) 11.81%; P (found) 12.10%.

The following compounds will serve to further illustrate the invention, and they are prepared in a manner substantially as outlined in the above examples:

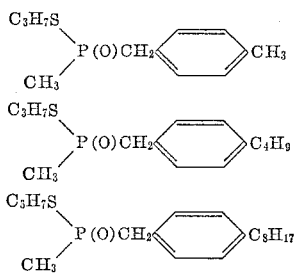

The phosphinothioate esters of this invention are effective against a wide variety of insects. The term "insects" as used herein will be understood in its broad sense as including spiders, mites, ticks, and the like which are not, biologically speaking, insects.

To illustrate the insecticidal activity of the phosphinothioate esters of this invention, the following examples of the activity of Examples 1 to 8 are offered. It will once again be understood that these are given merely for the purpose of illustration, and are not to be construed as limitations on the invention. The only limitations to be placed on the whole of the invention are those expressly set forth in the appended claims.

Solutions of the chemicals of Examples 1–8 were prepared so one ml. of solution contained 2, 4, or 8 mg. of active component. Three grams of whole wheat flour was placed in several 20 x 90 petri dishes, and three were used for each of the chemicals of this invention at each of the specified concentrations. For example, one ml. of the test solution of the chemical of Example 1, the solution containing 2 mg. of the chemical, was placed in each of three dishes. The flour and solution were mixed well, and the acetone was allowed to evaporate. Adult confused flour beetles, *Tribolium confusum*, were placed in the flour, and the dishes were covered. This procedure was repeated for the other chemicals at the stated concentrations. Results, taken after 48 hours, are set out in the following table. The results are averages of the replicates.

| Compound, Example | Rate, mg. | Percent Kill |
|---|---|---|
| 1 | 2 | 91 |
|   | 8 | 100 |
| 2 | 2 | 85 |
|   | 8 | 100 |
| 3 | 8 | 81 |
| 4 | 2 | 100 |
|   | 8 | 100 |
| 5 | 2 | 90 |
|   | 8 | 100 |
| 6 | 2 | 72 |
|   | 8 | 100 |
| 7 | 2 | 73 |
|   | 8 | 100 |
| 8 | 4 | 100 |
|   | 8 | 100 |

I claim:
1. A compound of the formula

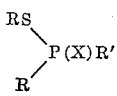

wherein R is an alkyl having from 1 to 4 carbon atoms, R' is a member of the group consisting of an olefinic hydrocarbon of up to about 12 carbon atoms, carbethoxy methyl and

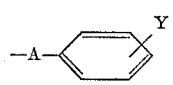

wherein A is alkylene containing up to 2 carbon atoms and wherein Y is a member of the group consisting of hydrogen, halogen and alkyl having from 1 to 12 carbon atoms, and X is a member of the group consisting of oxygen and sulfur.

2. A compound of the formula

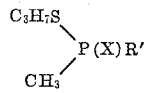

wherein R' and X are as defined in claim 1.

3. The compound of the formula

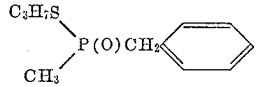

4. The compound of the formula

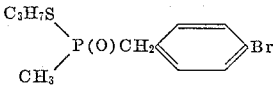

5. The compound of the formula

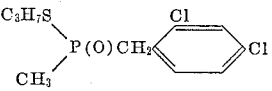

6. The compound of the formula

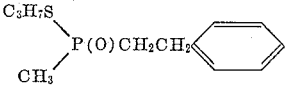

7. The compound of the formula

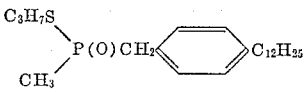

8. The compound of the formula

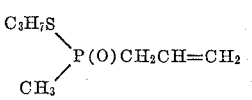

9. The compound of the formula

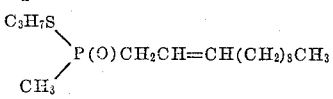

10. The compound of the formula
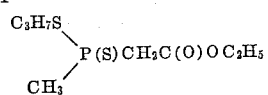
References Cited
UNITED STATES PATENTS
| 2,174,019 | 9/1939 | Sullivan | 87—9 |
| 2,720,535 | 10/1955 | Kesolapoff | 260—961 |
| 2,858,327 | 10/1958 | Higgins | 260—461 |
| 2,995,487 | 8/1961 | Jones | 167—30 |
| 3,081,330 | 3/1963 | Schrader | 260—461 |
| 3,117,986 | 1/1964 | Sehring et al. | 260—941 |
| 3,155,570 | 11/1964 | Schrader | 167—30 |
CHARLES B. PARKER, *Primary Examiner.*
J. S. LEVITT, *Examiner.*
J. GOLDBERG, B. BILLIAN, A. H. SUTTO,
*Assistant Examiners.*